UNITED STATES PATENT OFFICE 2,102,911

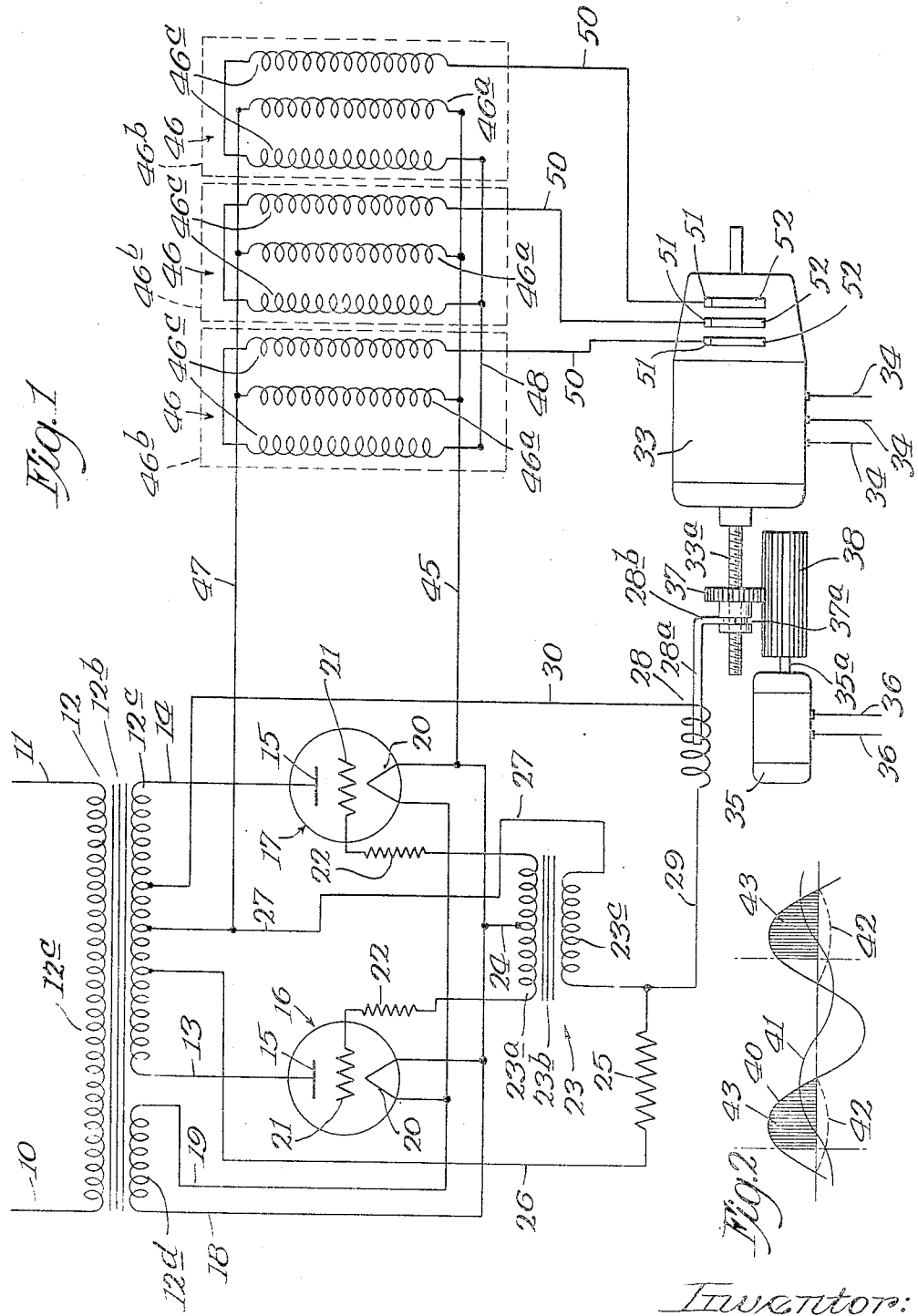

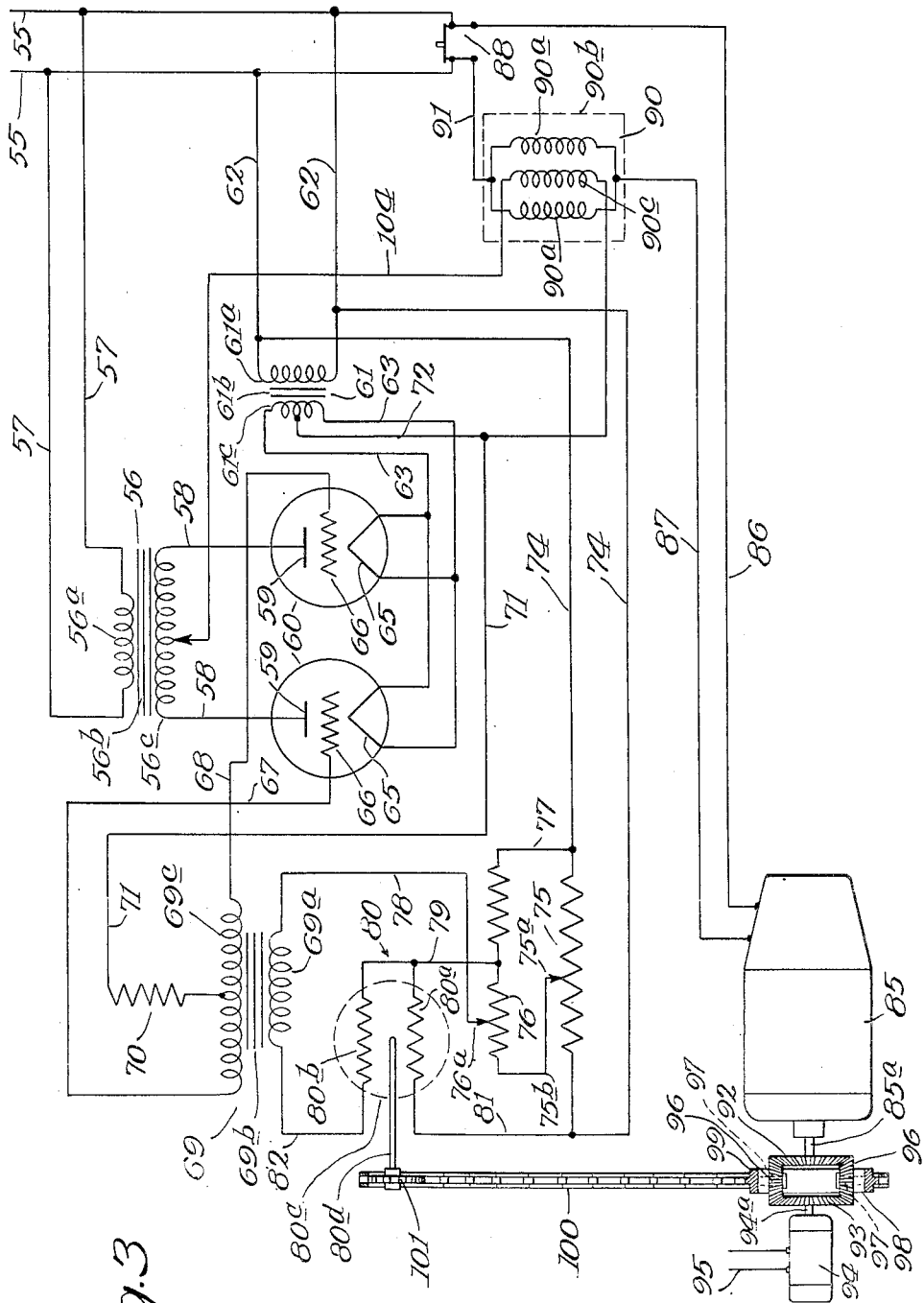

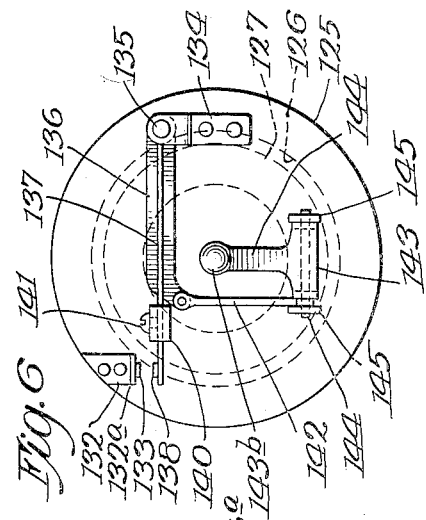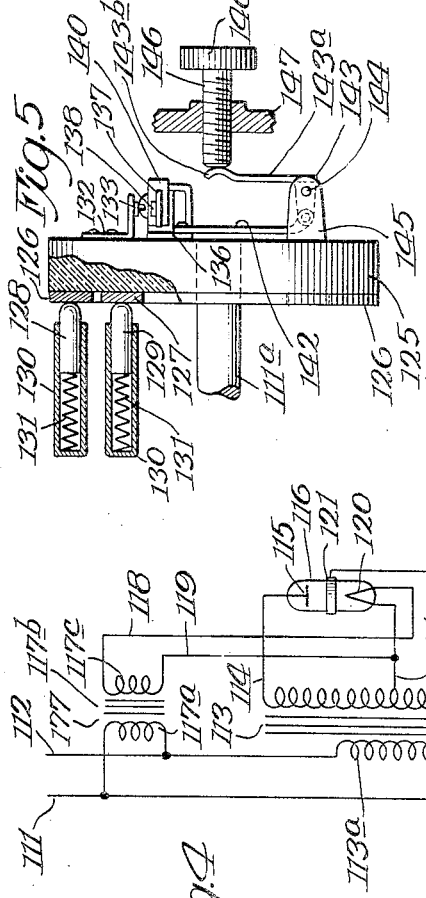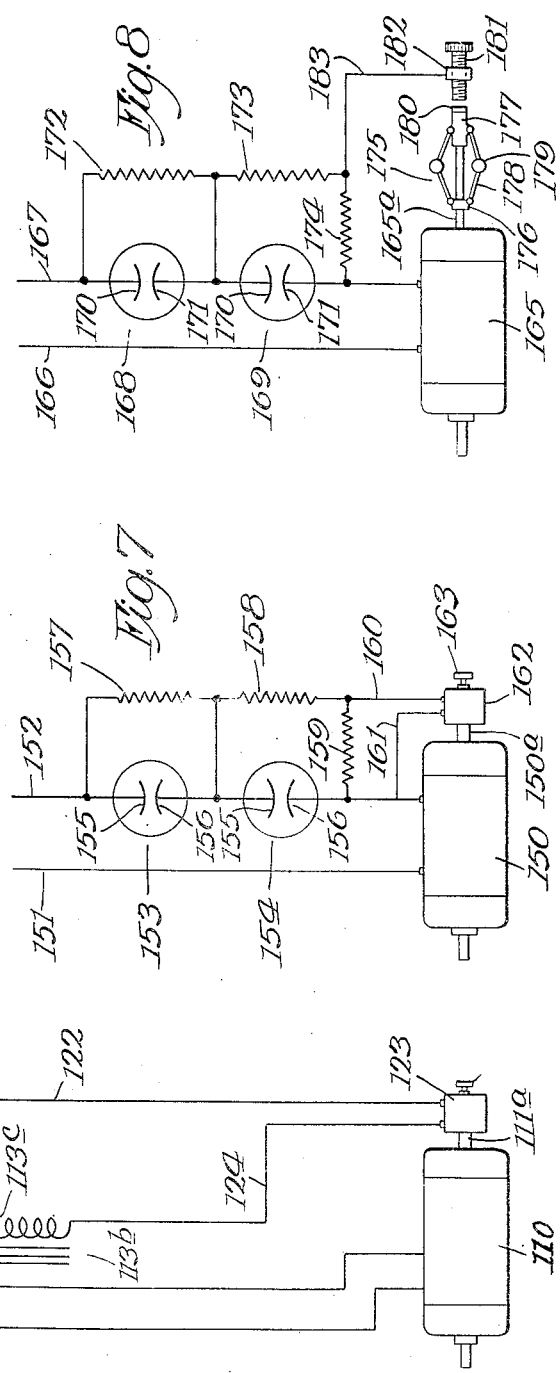

MOTOR CONTROL SYSTEM

William R. Perry, Columbus, Ind., assignor to Reeves Pulley Company, Columbus, Ind., a corporation of Indiana Application February 10, 1934, Serial No. 710,666

3 Claims. (Cl. 172—274)

This invention relates to improvements in motor control systems and its purpose is to provide a method and apparatus by which the speed of an electric motor, and particularly of an alternating current motor, may be regulated and maintained substantially constant within predetermined limits.

A mechanical governor control device has heretofore been employed for regulating the well known universal motor which is constructed as a series wound motor in order to permit its use with either alternating or direct current. The normal tendency of such a motor to operate with a wide variation of speed with variation in load has been compensated for by the use of the mechanical governor device which effects an intermittent make and break of the motor supply circuit, the frequency of which is responsive to changes in speed and torque of the motor. This method of control, while satisfactory for small fractional horse-power universal motors, is open to the objection that it involves the use of movable mechanical parts which necessarily carry appreciable currents, and is unsuitable for use with motors of any considerable power rating because of the sparking and arcing at the contacts where the circuit interruption takes place, which cause the contacts to deteriorate quickly and prevent a complete and prompt break of the circuit when the contacts are separated.

The present invention is designed to overcome these difficulties of prior methods of regulation and to provide a new system of control, applicable to alternating current motors of relatively large torque and current intake, wherein the effect of a periodic supply circuit interruption, or its equivalent, is produced with the use of a "grid glow tube", sometimes referred to as a "Thyratron". An intermittent but variable circuit interruption, which is responsive to changes of speed of the motor to be controlled, takes place within the grid glow tube and the resulting unidirectional pulsating current which flows from the tube is utilized, according to the present invention, for varying the impedance in the alternating current supply circuit of the motor, or for varying the impedance of a secondary circuit of the motor, such as the circuit of the wound rotor of an induction motor, or for otherwise affecting the circuit of the motor in such a way as to maintain the speed substantially constant regardless of the load.

The grid glow tube is a vacuum tight gas-filled tube of glass or the like having mounted therein an anode plate, a cathode and a grid, although the grid may take the form of a metal ribbon or shell surrounding the tube. The tube may be filled with mercury vapor or with one of the inert gases, argon, neon or helium, and the gas has a relatively low pressure, usually a few millimeters of mercury. If a potential is applied to this tube, a discharge takes place between the anode and the cathode when a certain critical potential is reached, and it has been found that the voltage at which this discharge begins may be varied within wide limits by the application of a control potential through the grid. The discharge takes place as a result of the ionization of the gaseous content of the tube when the critical potential is reached. At that critical point, the discharge takes place instantly and it then continues independently of the grid and even at lower potentials between the anode and the cathode, as long as the voltage applied between the anode and the cathode is sufficient to maintain it. The breakdown voltage is primarily a function of the electrode spacing and the gas pressure within the tube and the peculiarities of the tube are such that it may require a greater voltage to break down a short gap than a long one. It follows that if the grid be placed closer to the anode than to the cathode, which is the preferred practice, a breakdown may occur between the grid and the cathode at a much lower voltage than that required to start a discharge between the grid and the anode. When the control voltage applied to the grid reaches a sufficient magnitude, a discharge takes place between the cathode and the grid and, if there be then an intense field between the grid and the anode, the discharge is transferred immediately to the anode. The discharge then continues directly between the anode and the cathode with a greater current flow than that which initially passed between the cathode and the grid. Thus, the tube functions as an ionic relay in starting the discharge, which continues as long as the potential applied to the anode and cathode is sufficient to maintain it. If the grid glow tube be connected in an alternating current circuit, the discharge breaks down and extinguishes once during each cycle and must be again reestablished during each cycle in the same way.

These characteristics of the tube are made use of in the present invention by applying to the grid a voltage of which the magnitude or phase relation to the supply circuit, or both, are made to vary in response to speed changes of the motor to be controlled, with the result that the discharges of the tube produce a variable pulsating direct current output which may be employed in one of a number of ways to apply a continuing correction to the speed of the motor. Two grid glow tubes are preferably connected in the alternating current supply circuit in such manner that the potential applied to the anode of one tube is positive at the same time that the potential of the anode of the other tube is negative and the connections of the grids of those tubes are so made that the discharges take place alternately through the two tubes as the applied voltage alternates between positive and negative values. Thus, two discharges may be had during each cycle of the alternating current supply circuit and, these discharges being in the same directions in the two tubes, the resulting currents flow in the same direction and form a unidirectional pulsating current, the magnitude and duration of the pulsations depending upon the voltage applied to the grid and its phase relation to that of the supply circuit. By varying the impedance of the grid circuit, the phase relation of the grid voltage to that of the alternating current supply circuit may be varied to cause the discharge through each tube to begin at the desired point in the cycle and to continue through a predetermined portion of the cycle, with a corresponding effect upon the unidirectional current flowing from the tubes. This pulsating direct current is conveyed, according to the present invention, to a device adapted to exert a corrective effect upon the motor to be controlled, this device being preferably a saturable core reactor having windings connected in the alternating current supply circuit or other circuit of the motor, and other windings energized by the discharge current from the tubes. The pulsating current, varying with the motor speed, then operates to control the alternating current flowing through the reactor by varying the saturation of the iron core of the reactor and thereby changing the impedance of the alternating current motor circuit.

The alternating current circuit which is thus affected by the varying pulsating discharges through the tubes, may be the alternating current supply circuit of the motor or an alternating current circuit connected to the wound rotor of an induction motor, for example. The variation of the voltage of the grid circuit, and its phase relation to the supply circuit, at which the discharges through the tubes are started, may be made to occur in response to variations of the speed of the motor to be controlled with reference to another member rotating at constant speed predetermined and selected for the particular installation, such as the shaft of a small adjustable constant speed motor, and the differences of speed of the rotating members may be made to actuate the core of an inductance coil or the like, in order to change the impedance of the grid circuit. The use of the control system of the present invention also makes it possible to employ the mechanical governor devices heretofore referred to for controlling the speeds of relatively large motors since these mechanical governor devices may be used merely to effect an intermittent connection or disconnection, in response to changes in speed of the motor, of the grid circuit of the tube, in which a very small current flows, thus causing a voltage to be impressed upon the grid circuit at intervals, when the speed varies, with the result that discharges are caused to take place through the tube which exert a corrective effect upon the alternating current supply circuit leading to the motor. Since the circuit interrupted by the mechanical governor device is one having a small current flow, the objection to the use of a mechanical governor contact device is avoided. By means of this invention, the speed of rotation of the rotor of alternating current motors of various forms may be regulated within precise limits by utilizing the discharges through grid glow tubes.

The foregoing and other objects of the invention will be apparent from the following specification taken with the accompanying drawings, in which several forms of apparatus embodying the invention and capable of use for practicing the improved method of motor control are illustrated. In the drawings, Fig. 1 shows a diagrammatic view of the principal units of apparatus and the circuit connections therefor, in an alternating current system embodying the present invention and comprising means whereby changes of speed of an induction motor to be controlled cause the discharges through the grid glow tubes to effect the impedance of the wound rotor of the motor;

Fig. 2 is a diagram illustrating the fluctuations and the phase relations of the voltages applied to the anode and cathode terminals and to the grid of a grid glow tube, illustrating the effect of this phase relation in determining the starting point and the duration of the discharge through the tube;

Fig. 3 is a diagrammatic view of the circuit connections and apparatus of another form of the invention in which the variations in speed of an alternating current motor with respect to a small constant speed motor are recorded in differential apparatus which operates a voltage regulator for varying the points at which discharges take place through the grid glow tube, these discharges being employed for energizing the direct current coil of a saturable core reactor which has its alternating current coils connected in the supply circuit of the motor to be controlled;

Fig. 4 is a diagrammatic view of the apparatus and circuit connections of another form of the invention in which a mechanical governor device is employed for intermittently establishing the circuit of a grid glow tube;

Fig. 5 shows a side elevation of a portion of the mechanical governor device employed with the apparatus of Fig. 4, parts of this device being illustrated in vertical section;

Fig. 6 shows an end elevation of the mechanical governor device illustrated in Fig. 5;

Fig. 7 is a diagrammatic view of the apparatus and circuit connections of another form of the invention in which a mechanical governor device is employed for controlling discharges through two separate two-plate tubes which are employed in place of the grid glow tubes heretofore described; and Fig. 8 is a diagrammatic view of the apparatus and circuit connections of still another form of the invention which is similar to that illustrated in Fig. 7, except that a ball governor device is employed for intermittently interrupting a circuit of the discharge tubes.

The arrangement of apparatus illustrated in Fig. 1 is shown as being applied to the regulation of a three-phase alternating current induction motor having a wound rotor. The control apparatus is energized by a single phase alternating current circuit comprising a pair of line conductors 10 and 11 which are connected to the terminals of the primary winding 12ª of a transformer 12 having a magnetizable core 12ᵇ. This transformer has a secondary winding 12ᶜ which constitutes the anode coil and the terminals of this coil are connected through conductors 13 and 14 with the anode plates 15 of a pair of grid glow tubes 16 and 17. The transformer 12 also has an additional secondary winding 12ᵈ which constitutes the cathode coil and which has its terminals connected through conductors 18 and 19 with the terminals of the cathode filaments 20 forming parts of the grid glow tubes. In this way, an alternating current potential is applied to the anodes and cathodes of the grid glow tubes and the starting of the discharges through these tubes is controlled by the grids 21. These grids are connected through relatively high non-inductive resistances 22 with the terminals of the secondary winding 23ª of a grid transformer 23 having a magnetizable core 23ᵇ. The coil 23ª is connected at an intermediate point through a conductor 24 with the conductor 18 leading to the cathodes 20. The grid transformer 23 has a primary winding 23ᶜ from which one terminal is connected through a non-inductive resistance 25 and a conductor 26 with an intermediate turn of the secondary anode winding 12ᶜ of the transformer 12, while the other terminal of the primary winding 23ᶜ is connected through a conductor 27 with another intermediate turn of the transformer winding 12ᶜ.

The phase relation of the voltage applied to the grids 21 and the voltages applied to the anodes 15 and cathodes 20 is adapted to be adjusted by a variable inductor 28 which is connected by one conductor 29 with the transformer winding 23 and by another conductor 30 with one of the intermediate turns of the anode winding 12ᶜ of the transformer 12. The variable inductor 28 has an adjustable magnetizable core 28ª which may be moved longitudinally of the core for varying the impedance of the primary circuit of the grid transformer and thus changing the phase relation of the grid voltage with respect to the voltage applied to the anodes 15. The alternating current induction motor 33, the speed of which is to be regulated, is supplied with three-phase alternating current through the three conductors 34 and the variations of speed of this motor are measured with reference to the speed of the rotor of a small motor 35 which may be a single-phase or universal motor supplied with current through the conductors 36, capable of maintaining constantly any one of a plurality of speeds for which it may be adjusted, and having its speed regulated by a mechanical governor device such as that disclosed in the United States patent to Royal Lee No. 1,630,394, dated May 31, 1927. The shaft 33ª of the three-phase induction motor 33 to be controlled is screw-threaded and a gear 37 has its hub threaded for engagement by this shaft so that when the gear and the shaft are not rotating at the same speed, the gear moves longitudinally of the shaft. The magnetizable core 28ª of the variable inductor 28 has an arm 28ᵇ which engages an annular groove 37ª in the hub of the gear 37 so that the core moves longitudinally of the shaft with the gear. The shaft 35ª of the small constant speed motor 35 has mounted thereon an elongated pinion 38 which meshes with the gear 37. As long as the two motor shafts rotate at the same speed, or at speeds which maintain a predetermined, such as constant, relation to each other, the gear 37 maintains a constant position on the shaft 33 and rotates in unison therewith but if the speed of the rotor of the motor 33 varies from this predetermined constant speed, the resulting movement of the gear 37 longitudinally of the shaft 33ª causes a corresponding movement of the core 28ª of the variable reactor 28, thereby varying the inductance of reactor 28 and causing a variation in the phase relation of the grid voltage with a resultant variation of the critical point at which the discharge takes place through the tubes 16.

The curves represented in Fig. 2 show the effect of variation of the phase relation between voltage in the grid and voltage on the anode. The curve 40 represents the fluctuating alternating current voltage impressed upon the anodes of the grid glow tubes and the curve 41 represents the alternating current voltage impressed upon the grids 21, this voltage being of smaller value than the voltage represented by the curve 40 but having the same frequency. The dotted curves 42 represent the critical voltages at which the grid glow tubes break down and permit a discharge to take place. When the grid voltage, represented by the curve 41, reaches a value indicated by the point of intersection of the curve 41 with the curve 42, the discharge then begins between the anode and cathode of each tube and continues to the end of the half cycle of the curve 40, as shown by the shaded area 43 which represents current flow. In this instance, the grid voltage lags more than 180° behind the anode voltage so that the point at which a discharge begins through the tube is in advance of the point where the anode voltage reaches its positive maximum. It will be apparent that with other phase relations of the grid voltage, the breakdown will occur at other voltages and the current flow will continue for greater or lesser periods, depending upon the phase relation. The curves represented in Fig. 2 show above the base line a shaded area corresponding with the time there is a current flow through a single tube with a given phase relation and a corresponding current flow will take place through the other tube through that portion of the current cycle which is represented by that part of the curve extending beneath the base line, so that in a circuit leading from the grid glow tubes there is produced a pulsating direct current in which the root means square magnitude or duration of each pulsation are dependent upon the position of the core 28ª of the variable reactor 28.

The rectified current produced by the discharges through the grid glow tube 16 is conveyed therefrom through a conductor 45 connected to the terminals of the cathodes 20 to one terminal of each of the direct current windings 46ª of three saturable core reactors 46, each of which has an iron core represented by dotted lines at 46ᵇ. In this instance, the three direct current windings 46ª are connected in parallel and the other terminals of these windings are connected to a return conductor 47 which is connected to the previously described conductor 27 forming the return line of the grid circuit, the conductor 27 being connected to the primary winding of the grid transformer 23.

Each saturable core reactor also comprises a pair of alternating current windings 46ᶜ which are connected in series. One end of each series connected pair of alternating current windings is connected to a bridging conductor 48 and at the other end, each pair of series connected alternating current windings 46ᶜ is connected through one of the conductors 50 to a brush 51 bearing on one of the slip rings 52 of the motor 33. By means of this arrangement, the alternating current windings of the saturable core reactors are connected in the circuit of the wound rotor of the induction motor 33 to be regulated. In the reactors 46, the alternating current and direct current windings are so arranged as to prevent transformer action between the windings and changes in the amount of the direct current received from the grid glow tubes varies the degree of saturation of the cores 46ᵇ and thus regulates the amount of current permitted to pass through the alternating current windings of the reactors and the impedance of the closed circuit of the rotor of the motor 33. The torque of the motor, and consequently its speed, are thus varied in response to changes in the direct current delivered by the grid glow tubes and since the root means square value or effective voltage of the pulsations of this direct current are varied in response to changes in the speed of the motor 33, it will be apparent that the influence of the saturable core reactors upon the motor will be such as to correct the variation in motor speed and restore it to the predetermined standard sought to be maintained.

In Fig. 3, there is illustrated one method of applying the principles of the present invention to the control of the speed of a single-phase alternating current motor by varying the impedance in the line leading to the motor in response to changes in the motor speed. The current is supplied through line conductors 55 which may constitute the usual 110 volt, 60 cycle, power line and the connections for operating the motor as well as for actuating the various parts of the control apparatus are made to this power line. The control apparatus comprises an anode transformer 56 having a primary winding 56ᵃ, a magnetizable core 56ᵇ and a secondary winding 56ᶜ. The primary winding 56ᵃ is connected through conductors 57 with the line conductors 55 and the secondary winding 56ᶜ is connected through conductors 58 with the anode plates 59 of each of a pair of grid glow tubes 60. A cathode transformer 61, having a primary winding 61ᵃ, a core 61ᵇ and a secondary winding 61ᶜ, has its primary winding connected through conductors 62 with the supply conductors 55, and the terminals of the secondary winding 61ᶜ are connected through conductors 63 with the terminals of the cathode filaments 65 of the tube 60. In this way, the anodes and cathodes of the grid glow tubes are connected to the supply circuit and an alternating current voltage is impressed upon them continuously during the operation of the apparatus.

The discharges between the anodes 59 and cathodes 65 of the tube 60 are controlled by grids 66 located in the tubes and connected by conductors 67 and 68 with the opposite terminals of the secondary winding 69ᶜ of a grid transformer 69 which has a core 69ᵇ and a primary winding 69ᵃ. A resistance 70 is connected to an intermediate point of the secondary winding 69ᶜ and is connected through a conductor 71 with a conductor 72 leading to the center of the cathode transformer secondary winding 61ᶜ, thus completing the circuit of the primary winding of the transformer 69 and providing a resistance for limiting the grid current.

Current is supplied to the primary winding 69ᵃ of the grid transformer through conductors 74 which lead from the previously described conductors 62 by which current is supplied to the cathode transformer 61. These conductors 74 lead to the terminals of a wave form control potentiometer 75, having an adjustable tap 75ᵃ from which a lead 75ᵇ connects to one terminal of another wave form potentiometer 76. The other terminal of the potentiometer 76 is connected by a conductor 77 with one of the conductors 74 so that the potentiometer 76 is connected in parallel with the potentiometer 75 or a portion thereof. The potentiometer 76 has an adjustable contact 76ᵃ which is connected directly through a conductor 78 with one terminal of the primary winding 69ᵃ of the grid transformer 69. The characteristics and values of the potentiometers 75 and 76 and the contact points 75ᵃ and 76ᵃ are so selected and adjusted that the grid voltage has a proper wave form, i. e., approaches a sine wave.

Another conductor 79 leads from an intermediate point of the potentiometer 76 to one terminal of a variable reactor 80. One of the resistance coils 80ᵃ of this variable reactor is connected by a conductor 81 with the terminal of the potentiometer 75 opposite that to which the conductor 77 is connected. The other coil 80ᵇ of the variable reactor is connected through a conductor 82 with the remaining terminal of the primary winding 69ᵃ of the grid transformer. The voltage reactor has a rotary element 80ᶜ operated by a shaft 80ᵈ. Rotating the shaft 80ᵈ varies the reactance of one leg of the bridge circuit including windings 69ᵃ and resistors 75 and 76, thereby shifting the voltage impressed upon the grid transformer 69 and upon the tubes relatively to the anode voltage. This results in varying the breakdown point of the tubes and the current carried thereby, as described in connection with Figs. 1 and 2.

A single phase electric motor 85, the speed of which is to be controlled, is supplied with current through conductors 86 and 87, the former of which leads directly from one terminal of a double pole switch 88 through which the motor circuit is connected with the supply conductors 55. The other conductor 87 leading to the motor is connected at its other end to one terminal of the alternating current windings 90ᵃ of a saturable core reactor 90 which has a magnetizable core represented at 90ᵇ and a direct current winding 90ᶜ. The other terminal of the alternating current windings 90ᵃ is connected through a conductor 91 with the other terminal of the double pole switch 88. The motor 85 has a shaft 85ᵃ upon which is fixed a bevel gear 92 positioned opposite to a similar bevel gear 93 which is fixed upon the shaft 94ᵃ of a small constant speed motor 94 which may be a universal motor supplied with current through the conductors 95 and capable of being adjusted to operate at any desired constant speed within a considerable range. The motor 94 is adapted to run at constant speed and to be regulated in any suitable known manner such as that described in said Letters Patent of Royal Lee, above referred to. The gears 92 and 93 mesh with differential gears 96 which are mounted to revolve about shafts 97 carried by a revolvable cage 98. A sprocket gear 99 is mounted on the cage 98 with its axis concentric with the axes of the shafts 85ᵃ and 94ᵃ and an endless sprocket chain 100, passing around this sprocket gear, connects the differential with another sprocket gear 101 mounted upon the shaft 80ᵈ of the variable reactor 80. As long as the rotor of the shaft 85 is revolved at a constant speed corresponding to the speed of the shaft 94ᵃ of the constant speed motor 94, the bevel gears 96 revolve about their shafts and the cage 98 and sprocket gear 99 remain stationary but, as soon as the speed of the motor 85 rises above or falls below the desired standard, the differential gears 96 revolve bodily about the common axis of the shafts 85ᵃ and 94ᵃ with the result that the sprocket gear 99 revolves and causes the sprocket chain 100 to actuate the variable reactor 80. The phase of the voltage impressed upon the grids 66 of the grid glow tubes is correspondingly varied with a resulting change in the character and duration of the discharges through the grid glow tubes. The rectified current which is produced by these discharges passes through the conductors 73 and the conductor 103 to one terminal of the direct current winding 90ᶜ of the saturable core reactor 90. The other terminal of this winding 90ᶜ leads through a conductor 104 to an intermediate point on the secondary winding 56ᶜ of the anode transformer 56, thus completing the direct current circuit of the grid glow tubes. The direct current passing through the coil 90ᶜ of the reactor 90 varies the saturation of the iron core 90ᵇ and thus affects the impedance of the supply circuit of the motor 85 through the effect upon the coils 90ᵃ of the reactor. In this way, the speed of the motor 85 is corrected by causing the discharge currents of the grid glow tubes to exert a corrective effect upon the supply circuit through the saturable core reactor 90, the effective voltage applied to the motor being either decreased or increased depending upon whether the speed of the motor has momentarily increased or decreased, respectively. With this arrangement of apparatus, the motor 85 may be caused to maintain a substantially constant speed, within precise limits, identical with the adjusted constant speed of the motor 94.

In Figs. 4, 5 and 6 there is illustrated another modification of the invention in which a simplified form of apparatus is controlled by a mechanical governor operated by the motor and constituting a part of the present invention. In this form, the motor 110 is supplied with single phase alternating current through the line conductors 111 and 112. The primary winding 113ᵃ of a transformer 113 is connected in the conductor 112. This transformer has a core 113ᵇ and a secondary winding 113ᶜ. A conductor 114, leading from one terminal of the secondary winding 113ᶜ, leads to the anode 115 of a grid glow tube 116. In addition to the transformer 113, there is provided a separate cathode transformer 117 having a primary winding 117ᵃ which is connected across the line conductors 111 and 112. This transformer has a core 117ᵇ and a secondary winding 117ᶜ which is connected by conductors 118 and 119 to the terminals of the cathode filaments 120 of the grid glow tube. A conductor 121 connects the conductor 119 with an intermediate point on the secondary winding 113ᶜ of the transformer 113. In this instance, the grid glow tube 116 is illustrated as having a grid 121 located on the outside of the tube in the form of a surrounding metal band. This form of grid glow tube is commonly called a "kathetron". This grid is connected through a conductor 122 with a mechanical governor device 123 which is mounted on and adapted to be operated by the rotating shaft 111ᵃ of the motor. Another conductor 124 leads from the mechanical governor device 123 and the terminal of the secondary transformer winding 113ᶜ opposite to that terminal which is connected to the anode 115.

The mechanical governor device 123 is illustrated particularly in Figs. 5 and 6, where it is shown as comprising a cylindrical block 125 of insulating material mounted to rotate with the motor shaft 111ᵃ. A pair of concentric metallic contact rings 126 and 127 are mounted on the inner face of this block and connections are made between these contact rings and the conductors 122 and 124 by means of brushes 128 and 129, respectively, which are mounted in tubes 130 and actuated by coil springs 131 so that they are maintained normally in engagement with the contact rings during the rotation of the block. The outer contact ring 126 is connected through the insulating block 125 with a terminal plate 132 having an outwardly directed flange 132ᵃ upon which is mounted a contact 133. The other contact ring 127 is connected through the insulating block 125 with another contact plate 134 which has mounted thereon a pin 135 upon which is pivoted an arm 136. A contact spring 137 is also mounted on the pin 135 to move with the arm 136 which extends substantially parallel thereto. The leaf spring 137 carries at its free end a contact 138 which is adapted to coact with the contact 133 to close the circuit between the two contact rings 126 and 127 and thereby establish a connection between the conductors 122 and 124. A weight 140 is slidably mounted on the leaf spring 137 and is adapted to be secured in adjusted position by a set screw 141. The contacts 133 and 138 are normally separated and are adapted to be brought into engagement with each other by the action of centrifugal force in carrying the free end of the spring and the weight 140 outwardly during the rotation of the block 125. The speed at which the contacts are closed by the action of centrifugal force is determined by the position of the block 140 on the spring 137 and may be further regulated by adjusting the initial position of the spring. The end of the spring which engages the pin 135 is rigid with respect to the arm 136 and by turning this arm about the pin, the initial separation of the contacts 133 and 138 may be varied as desired. This adjustment may be accomplished by connecting the outer end of the arm 136 through a link 142 with the short arm of a bell crank lever 143 which is pivoted at 144 on a bracket 145 carried by the block 125. The bell crank lever 143 has an upwardly extending arm 143ᵃ provided at its upper end with an enlarged portion 143ᵇ which is located in alignment with the axis of rotation of the block 125 and adapted to be engaged by an adjusting member 146 which threadedly engages the front wall of the casing 147 of the contact apparatus 123. As the block 125 rotates, the enlarged extremity 143ᵇ of the bell crank lever maintains its engagement with the adjusting member 146 and this adjusting member has an enlarged head 146ᵃ which may be engaged by the fingers of the operator for adjusting the initial spaced relation of the contacts 133 and 138, thus regulating the motor speed which must be obtained in order to cause the contacts to close under the influence of centrifugal force.

Assuming that the motor is running at normal or standard speed and due to decrease in load there is an increase of motor speed above the standard speed sought to be maintained, the effect of the increased centrifugal force is to carry the outer end of the contact spring 130 outwardly and thus establish a connection between the contacts 133 and 138. This connects the conductors 122 and 124 and closes the circuit to the grid 121 with the result that the negative potential impressed on the grid at the next positive half cycle of the anode voltage controls the electrons emitted by the cathode 120 and prevents the tube 116 from breaking into a glowing and highly conductive state each time the anode 115 becomes positive, as would otherwise occur. By thus increasing the tube impedance and the impedance of the secondary circuit of the transformer 113, substantially to infinity, the impedance of the transformer primary is very greatly increased with the obvious result that the voltage across the motor 111 becomes nearly zero and that the motor speed drops. As soon as the speed drops, the contacts 113 and 138 are again separated so that the initial circuit conditions are again established in which the tube breaks into glow at each positive half cycle of the anode voltage.

In this way, a mechanical governor device is utilized for effecting an intermittent make and break of the grid circuit in which a relatively small current flows so that the ionic relay is employed for controlling the speed of a motor which may be of relatively large size and have a relatively large current intake, without encountering the objectionable conditions which would be experienced if the supply circuit itself were intermittently interrupted as in the prior practice of regulating small universal motors.

In Fig. 7 there is illustrated a further embodiment of the invention in which a single phase alternating current motor 150, such as a series wound motor, is supplied with alternating current through conductors 151 and 152. The conductor 152 has connected therein a pair of linear conduction glow tubes 153 and 154 each having two terminals or discharge plates 155 and 156. A comparatively high non-inductive resistance 157 is connected in parallel with the tube 153 and a low non-inductive resistance 158 and a high non-inductive resistance 159 are connected in parallel with the tube 154. Resistance 157 is substantially equal to the sum of the resistances 158 and 159. The high resistance 159 is adapted to be short-circuited by two conductors 160 and 161 which lead to a mechanical governor device 162 adapted to be actuated by the rotating shaft 150ᵃ of the motor. The mechanical governor device 162 may be constructed along the lines illustrated in Figs. 5 and 6 with an adjusting member 163 threadedly engaging the casing of the device for adjusting the speed at which the contacts are operated by centrifugal force, but the arrangement of the contacts in this apparatus is preferably reversed, as shown in the above mentioned patent of Royal Lee, so that the effect of a decrease in speed is to close the contacts and establish a connection between the conductors 160 and 161. When this occurs, the high resistance 159 is short-circuited so that substantially the full voltage in live wires 151 and 152 is impressed on tube 153, causing it to break into glow and very greatly lower its impedance. This causes the voltage across tube 154 to be so high that it also breaks into glow. The thus reduced impedance in the tubes increases the voltage across the motor, causing it to accelerate, until the motor and governor reach a speed at which the contact points open, and restore a balance of voltage on the glow tubes whereby neither tube receives sufficient voltage on the succeeding cycle to break it down.

In Fig. 8 of the drawings there is illustrated another form of the invention which is similar to that illustrated in Fig. 7 except that a different form of centrifugal governor is provided for controlling the contacts of the circuit. In this form, a motor 165 is supplied with current through alternating current line conductors 166 and 167. A pair of linear conduction glow tubes 168 and 169, each having an anode 170 and a cathode 171, are connected in series with the motor through the conductor 167. The circuit of the motor is normally established through circuits which are in parallel with the tubes including the circuit of a high non-inductive resistance 172 which is connected in parallel with the tube 168 and a low non-inductive resistance 173 and a high non-inductive resistance 174 which are connected in parallel with the tube 169. The high resistance 174 is adapted to be short-circuited to cause a discharge to take place through the tubes by means of a ball governor contact device 175 comprising a collar 176 fixed on the shaft 165ᵃ of the motor and a sleeve 177 which is slidably mounted on that shaft. The collar and the sleeve are connected by links 178 with balls 179 which are adapted to be thrown outwardly by centrifugal force when the speed increases. The sleeve 177 carries a contact 180 which is connected through the motor shaft with the line conductor 167 and this contact is adapted to engage a contact member 181 which is adjustably mounted in a stationary member 182. This member 182 is connected by a conductor 183 with the shunt circuit around the tube 169 at a point between the resistances 173 and 174. The result is that when the speed of the motor 165 falls, the balls 179 move radially inward and the contact 180 engages the contact member 181, thereby short-circuiting the high resistance 174 and causing discharges to take place through the tubes 168 and 169 with the result that the voltage applied to the motor is increased and the speed of the motor is corrected.

Although several forms of apparatus embodying the principles of the present invention have been shown and described by way of illustration in connection with the explanation of several illustrations of the use of the method of the present invention in controlling motor speed with the use of an ionic relay, it will be understood that the invention may be embodied in various forms and arrangements of apparatus and may be practiced in various ways within the scope of the appended claims.

I claim:

1. The combination in apparatus for controlling the speed of an alternating current motor, of a circuit for said motor, a saturable core reactor having alternating current windings connected in said circuit, a grid glow tube, means for impressing an alternating current voltage on the terminals of said tube, means for impressing another alternating current voltage on the grid of said tube, means for causing direct current discharges of said tube to affect said saturable core reactor, means responsive to changes in the speed of said motor for varying the voltage applied to said grid, and means for varying the wave form of said grid voltage.

2. The combination in apparatus for controlling the speed of an alternating current motor, a circuit for said motor, an ionic relay, means for causing said ionic relay to vary the impedance of said motor circuit, a second motor running at constant speed adjacent said first named motor, and means for causing differences in the speeds of said motors to control the action of said ionic relay.

3. The combination in apparatus for controlling the speed of an alternating current motor, of a circuit for said motor, means including a grid glow tube for varying the impedance of said motor circuit, means for applying an alternating voltage current to the terminals of said grid glow tube, means for applying another alternating current voltage to the grid of said tube, a second motor operating at constant speed adjacent said first named motor, and means operated in response to changes in the speed of said first named motor with respect to said second named motor for varying the phase relation of said grid voltage with respect to said first named alternating current voltage.

WILLIAM R. PERRY.